United States Patent [19]

Johnsson

[11] Patent Number: 4,783,088
[45] Date of Patent: Nov. 8, 1988

[54] SEALING ASSEMBLY FOR SEALING AN OPENING IN A PLATE THROUGH WHICH A SHAFT EXTENDS

[75] Inventor: Ulf Johnsson, Malmö, Sweden

[73] Assignee: AB Tetra Pak, Lund, Sweden

[21] Appl. No.: 27,545

[22] Filed: Mar. 18, 1987

[30] Foreign Application Priority Data

Mar. 20, 1986 [SE] Sweden .................. 86-01303

[51] Int. Cl.⁴ .................. F16J 15/12
[52] U.S. Cl. .................. 277/167.5; 277/105; 277/177; 277/178; 277/183
[58] Field of Search .................. 277/105, 106, 112, 177, 277/167.5, 178, 181–183, 186

[56] References Cited

U.S. PATENT DOCUMENTS

| | | |
|---|---|---|
| 2,103,555 | 12/1937 | Rowe . |
| 2,647,002 | 7/1953 | Brummer .................. 277/178 |
| 3,179,423 | 4/1965 | McCloud . |
| 3,537,711 | 11/1970 | Walker .................. 277/178 X |
| 3,627,332 | 12/1971 | Tronser . |
| 4,331,338 | 5/1982 | Caldwell et al. .................. 277/177 X |

FOREIGN PATENT DOCUMENTS

| | | |
|---|---|---|
| 1285035 | 1/1962 | France . |
| 409041 | 4/1934 | United Kingdom .................. 277/178 |
| 746852 | 3/1956 | United Kingdom .................. 277/105 |
| 757096 | 9/1956 | United Kingdom . |

*Primary Examiner*—Robert S. Ward
*Attorney, Agent, or Firm*—Burns, Doane, Swecker & Mathis

[57] ABSTRACT

An arrangement for sealing an opening in a plate (1) through which a shaft extends, the plate separating the "wet" and the "dry" zones of a packing machine from each other. In packing machines great demands are made on the tightness and durability of such shaft bushings, especially against strong washing agents, and the sealing assembly in accordance with the invention, therefore, has a flexible connection with the plate (1) and two O-rings (9,10), which are partly enclosed by two halves of a sealing assembly. Thereby, the O-rings are protected during washing as well as during operation. This design also produces a good sealing effect even when the shaft moves a little in radial direction during operation.

7 Claims, 1 Drawing Sheet

U.S. Patent
Nov. 8, 1988
4,783,088
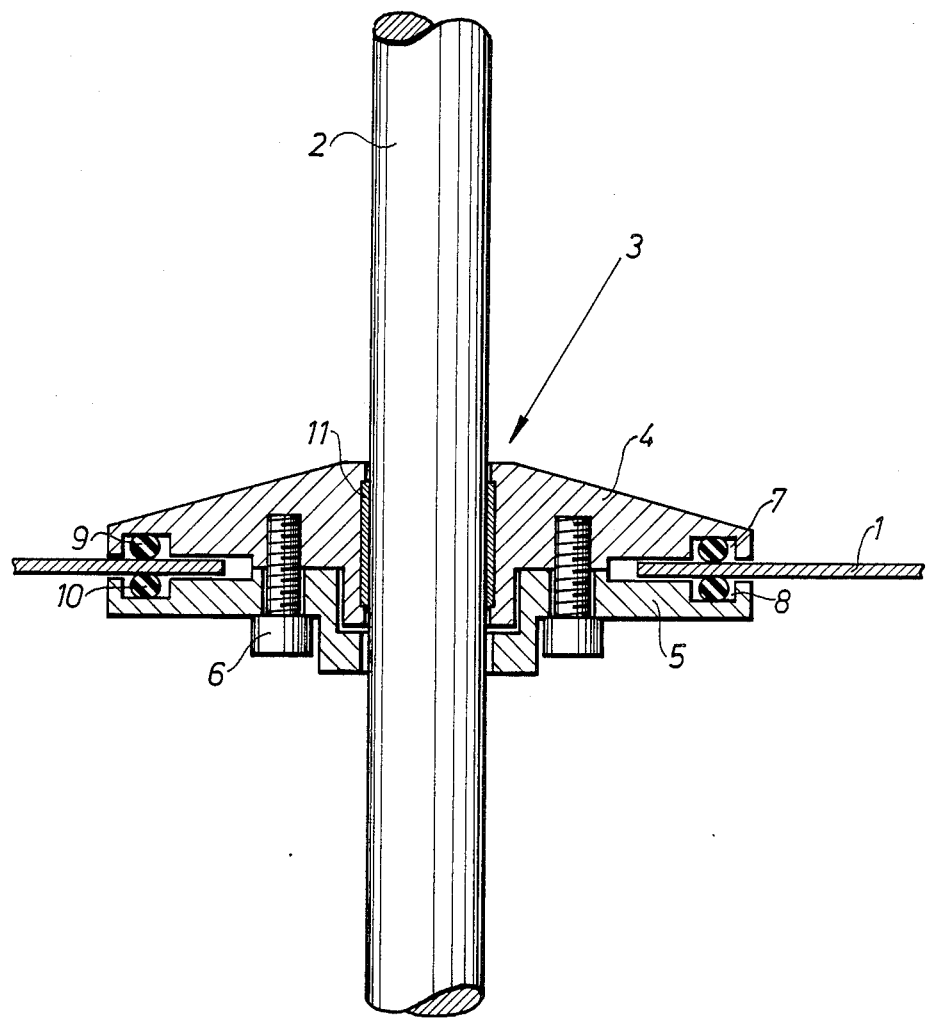

SEALING ASSEMBLY FOR SEALING AN OPENING IN A PLATE THROUGH WHICH A SHAFT EXTENDS

FIELD OF THE INVENTION

The present invention relates to an arrangement for the sealing an opening in a plate through which a shaft extends.

BACKGROUND OF THE INVENTION

Shaft bushings in plates (e.g. walls, guard-plates or the like) can be sealed in various manners in order to prevent contaminations or liquid from passing along the shaft. In cases of axially movable, reciprocating shafts flexible bellows of rubber or plastics are generally used, which are connected in a liquid-tight manner on the one hand to the shaft, on the other hand to the plate along the edge of the hole through which the shaft extends. In cases of shafts with large axial movements seals of very high flexibility are required, not only in the longitudinal direction of the shaft but also radially, since shafts of this type during maneuvering frequently move a little in a lateral direction. Therefore, in this type of shaft bushing rubber bellows and the like occasionally cannot be used.

Within certain technical fields, e.g. in machines for the packaging of liquid foodstuffs, the packing machine is divided into a "wet" and a "dry" zone. In the wet zone filling of the packing containers takes place along with a part of the forming work and closing of the packing containers. It must be possible to clean the wet zone with strong washing agents and to flush it with water and possibly steam. The dry zone comprises the driving and lubricating system of the machine which must be completely separated from the wet zone. Between the two zones, which are separated from one another by means of a frame plate of stainless steel, run shafts with axial as well as rotational movement. The sealing of these shafts has to be done very carefully, on the one hand because of the handling of delicate food substances (milk etc.) which on no account must be allowed to take up the flavor of, or be contaminated by, the driving system of the machine, on the other hand because of the use of harsh cleaning and sterilizing agents which must not be permitted to enter into the dry zone of the machine.

OBJECTS AND SUMMARY OF THE PRESENT INVENTION

It is an object of the present invention to provide a flexible arrangement for the sealing an opening in a plate through which a shaft extends this arrangement being designed so that it is especially suitable for use in packing machines, and more particularly for the sealing of shafts which, performing primarily an axial, but also a radial, reciprocating movement, pass through a plate which divides wet and dry zones of the machine.

It is a further object of the present invention to provide a shaft seal of the abovementioned type, this shaft seal being of such a design that it provides good resistance to the harsh operating conditions which exist in a packing machine and is not affected either by cleaning agents, oil or by high temperatures.

It is a further object of the present invention to provide a shaft seal of the abovementioned type which is resistant to wear, is simple and reliable as well as low in cost.

These and other objects have been achieved in accordance with the invention in that an arrangement of the type described in the introduction has been given the characteristic, that it comprises an assembly surrounding the shaft in a slidable manner, which has two halves facing each other which via intermediate flexible sealing material rest against the plate in an area surrounding the shaft.

Preferred embodiments of the arrangement in accordance with the invention have been given the characteristics which are evident from the subsidiary claims.

By designing the arrangement in accordance with the invention as a two-part assembly where axial movement of the shaft is made possible by a slide bearing tightly surrounding the shaft, and the radial movement of the shaft is taken up via the flexible sealing rings, an arrangement of the required flexibility is obtained which does not include any accessible rubber or plastic components which may be damaged by the sometimes aggressive environment in a packing machine. The design of the arrangement brings with it also great durability in respect of high temperatures and wear, and the parts which eventually do wear out can be exchanged at low cost, since they constitute standard components.

BRIEF DESCRIPTION OF THE DRAWING

A preferred embodiment of the arrangement in accordance with the invention will now be described in more detail with special reference to the attached schematic drawing which only shows the details necessary for an understanding of the invention.

DETAILED DESCRIPTION OF A PREFERRED EMBODIMENT

In a packing machine (not shown), which e.g. may be of the type which is described in Swedish Pat. No. 361857, a "wet" and a "dry" zone exist which are separated from each other by means of a substantially horizontally placed plate 1 of stainless steel. Above the plate 1 is the wet zone of the machine, that is to say the part of the packing machine where the packing containers are formed from more or less prepared packing material by folding, forming and sealing, and are filled with the desired contents and closed. In this zone very high demands are made on cleanliness and hygiene, and the wet zone is washed, therefore, frequently with strong washing agent, e.g. caustic soda, and is flushed with water or steam.

Underneath the plate 1 is the "dry" zone of the machine where the driving system of the machine is located with electric motors, shafts and cams which are lubricated by means of a comprehensive lubricating system. This zone must not be reached by cleaning agent or contents, since in such a case the lubricating system as well as the electrical components might be damaged. Similarly it is of greatest importance, of course, that lubricating oil or contaminations from the dry zone cannot reach the wet zone of the packing machine, since the foodstuff products handled here in such a case might be contaminated or take up the flavor of e.g. the lubricating oil.

Through the plate 1 pass a number of shafts, substantially vertically, these shafts being required for the transmission of movement from the driving system of the machine to the different units for forming, sealing and filling which are located in the wet zone of the machine (these components are not described in more detail since they are not directly connected to this invention, but reference is made to the Swedish patent mentioned earlier which provides a detailed description of a packing machine of the type in which the arrangement according to invention advantageously can be used).

One of the shafts which pass through the plate 1 is indicated in the FIGURE by the reference designation 2. The shaft 2 extends vertically through the plate 1 and has an axially reciprocating movement. The shaft 2 extends through a circular hole in the plate 1 and is sealed off with the help of a sealing assembly 3 in accordance with the invention. The sealing assembly consists of an upper part or sealing member 4 and a lower part or sealing member 5 which are manufactured from a corrosion-resistant material (stainless steel) and are held together by means of a number of fixing devices 6 in the form of screws which are threaded into the upper sealing member 4 of the sealing assembly 3 and pass through freerunning holes in the lower sealing member 5. The two assembly parts 4,5 have recesses on their inner end surface which face each other in the form of concentric slots 7,8 wherein are located O-rings 9 and 10 respectively. With the help of the fixing devices 6 the two sealing members 4,5 of the sealing assembly are pressed in direction towards each other so that the two O-rings 9,10 (but not the assembly parts 4,5) will rest against the upper and lower surface respectively of the plate 1 in an area enclosing the shaft along the edge of the hole in the plate provided for the passage of the shaft.

In the central part of the sealing assembly 3 is a concentric hole for the shaft 2 wherein is located a slide bearing 11. The slide bearing, which may be manufactured from any suitable bearing material known in itself, is supported by the upper part 4 of the sealing assembly 3 which extends down below the plane of the plate 1 in a corresponding recess in the lower part 5 of the sealing assembly 3. The part of the hole for the shaft 2 which is located in the lower part 5 of the sealing assembly has a slightly larger diameter than the shaft 2 and lack a slide bearing, so that the shaft 2 can pass freely without contact with the lower part 5.

The design described of the arrangement in accordance with the invention makes it possible for the shaft 2 to perform its reciprocating, axial movement only by gliding axially in the glide bearing 11 without the sealing assembly 3 otherwise being affected. However, if, as is frequently the case, the axial movement is combined with a certain radial movement the sealing assembly 3 may be displaced in lateral direction without the sealing contact between the flexible O-rings 9,10 and the two sides of the plate 1 being lost, since the uppr and the lower sealing members 4,5 are screwed together only until the O-rings 9,10 rest against the two sides of the plate 1. Thus there is no direct contact between either the upper or the lower half and the plate 1, but each part 4,5 has a clearance of approx. 0.5–1 mm to the plate. This clearance, which is delimited by the mutual contact between the central portions of the two sealing members 4,5, ensures that the movement of the sealing assembly 3 in lateral direction is limited only by the flexibility of the O-rings.

For a number of reasons, the sealing assembly 3 in accordance with the invention is very suitable for being used in packing machines. The upper side of the assembly, that is to say the side facing towards the "wet" zone of the packing machine, is wholly smooth and lacks screwholes, grooves or the like which may collect dirt and are difficult to clean. The assembly is very durable in respect to the demanding environment in a packing machine, since the more sensitive parts of the assembly, that is to say the two O-rings, rest well-protected between the two assembly parts 4,5 manufactured from stainless steel. Thanks to their placing the O-rings are protected from being sprayed directly with cleaning agent or steam, as well as from oil spatter, and they possess therefore a long service life. When they have to be exchanged all the same the substitution, thanks to the simple design of the assembly, can be done in a simple manner and at low cost, since the O-rings are standard components. The slide bearing of the sealing assembly, which also may be of a standard type, likewise has long durability since the design of the assembly and the flexible setting in the plate 1 brings with it a certain inclination of the shaft 2 without the wear being increased appreciably.

An arrangement in accordance with the invention has proved in practical tests to function well and the combination of "floating" manner of fixing and durable material give a very well sealing function over a long time.

While this invention has been illustrated and described in accordance with a preferred embodiment, it is recognized that variations and changes may be made and equivalents employed herein without departing from the invention as set forth in the claims.

What is claimed is:

1. A sealing assembly for sealing an opening of a given diameter in a plate of a given thickness through which a shaft extends, the assembly comprising:
   a body portion having a diameter larger than the diameter of the opening and including a hole for receiving the shaft and an annular plate receiving groove having a radially inner surface and annular side surfaces extending radially outwardly from the inner surface, the radially inner surface having a diameter smaller than the diameter of the opening and having a width larger than the thickness of the plate, the annular side surfaces including annular slots of a diameter larger than the diameter of the opening; and
   sealing means for sealing the space between the plate and the annular side surfaces of the plate receiving groove and for spacing the body portion from the plate.

2. The sealing assembly according to claim 1, wherein the body portion includes first and second body parts each including one of the annular side surfaces of the plate receiving groove.

3. The sealing assembly according to claim 1, wherein the annular slots are located at a position displaced radially inwardly from the outer circumference of the body portion, the slots each including at least two slot surfaces which hold the sealing means.

4. The sealing assembly according to claim 1, wherein the sealing means includes a sealing ring provided in each of the annular slots.

5. The sealing assembly according to claim 4, wherein the sealing rings are O-rings made of a material which is flexible relative to the body portion.

6. The sealing assembly according to claim 1, further comprising a slide bearing supported in the hole of the body portion, the guide bearing being adapted to receive the shaft.

7. The sealing assembly according to claim 2, further comprising means for holding the first and second body parts together and for holding the sealing means in a position sealing the space between the plate and the annular side surfaces of the plate receiving groove.

* * * * *